United States Patent [19]

Miller et al.

[11] Patent Number: 4,610,890
[45] Date of Patent: Sep. 9, 1986

[54] PREPARATION OF SOLID ESSENTIAL OIL FLAVOR COMPOSITION

[75] Inventors: Dennis H. Miller, Safety Harbor, Fla.; Jerry R. Mutka, Corona, Calif.

[73] Assignee: Sunkist Growers, Inc., Sherman Oaks, Calif.

[21] Appl. No.: 754,105

[22] Filed: Jul. 12, 1985

Related U.S. Application Data

[63] Continuation-in-part of Ser. No. 631,302, Jul. 16, 1984, abandoned.

[51] Int. Cl.⁴ .............................................. A23L 1/222
[52] U.S. Cl. ........................................ 426/651; 426/96
[58] Field of Search ................................... 426/651, 96

[56] References Cited

U.S. PATENT DOCUMENTS

| | | | |
|---|---|---|---|
| 2,809,895 | 10/1957 | Swisher | 426/651 X |
| 2,856,291 | 10/1958 | Schultz | 426/651 X |
| 2,857,281 | 10/1958 | Schultz et al. | 426/651 |
| 2,899,313 | 8/1959 | Makower | 426/651 X |
| 2,919,989 | 1/1960 | Schultz | 426/651 |
| 2,929,722 | 3/1960 | Schultz et al. | 426/651 X |
| 2,929,723 | 3/1960 | Schultz et al. | 426/651 X |
| 3,041,180 | 6/1962 | Swisher | 426/651 X |
| 3,704,137 | 11/1972 | Beck | 426/651 |
| 4,271,202 | 6/1982 | Giel | 426/651 X |

Primary Examiner—Joseph Golian
Attorney, Agent, or Firm—Paul A. Weilein

[57] ABSTRACT

A solid essential oil flavor composition having a high essential oil content and a process for preparing the product are disclosed, the process involving preparation of a heated or cooked aqueous mixture of a sugar and starch hydrolysate together with an emulsifier. A selected essential oil or other oil-soluble flavor is combined and blended with a mixture in a closed vessel under controlled pressure conditions to form a homogeneous melt, the melt being extruded into a relatively cool solvent, dried and combined with a selected anticaking agent to produce the stable, relatively non-hygroscopic particulate flavor composition of the invention. The selected quantity of essential oil flavor blended into the homogeneous melt being sufficient to yield about 12 to 35% by weight of essential oil in the encapsulated solid particulate composition. During the process, encapsulation efficiency is maintained preferably at or above about 60%, more preferably above about 70% and most preferably above about 75 to 80%. Also, the cook temperature for the process is preferably maintained at or below a maximum of about 126° C.

12 Claims, 2 Drawing Figures

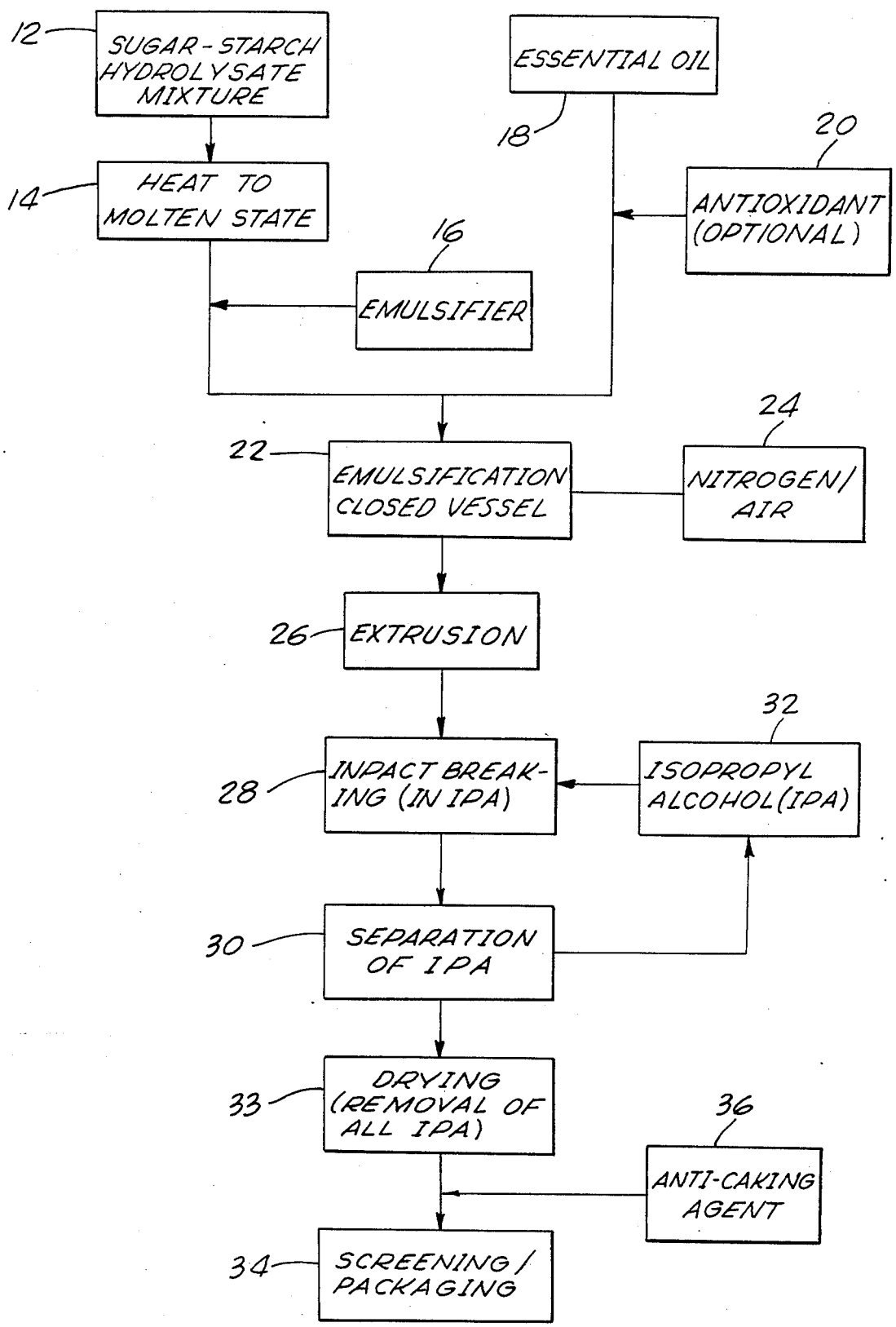

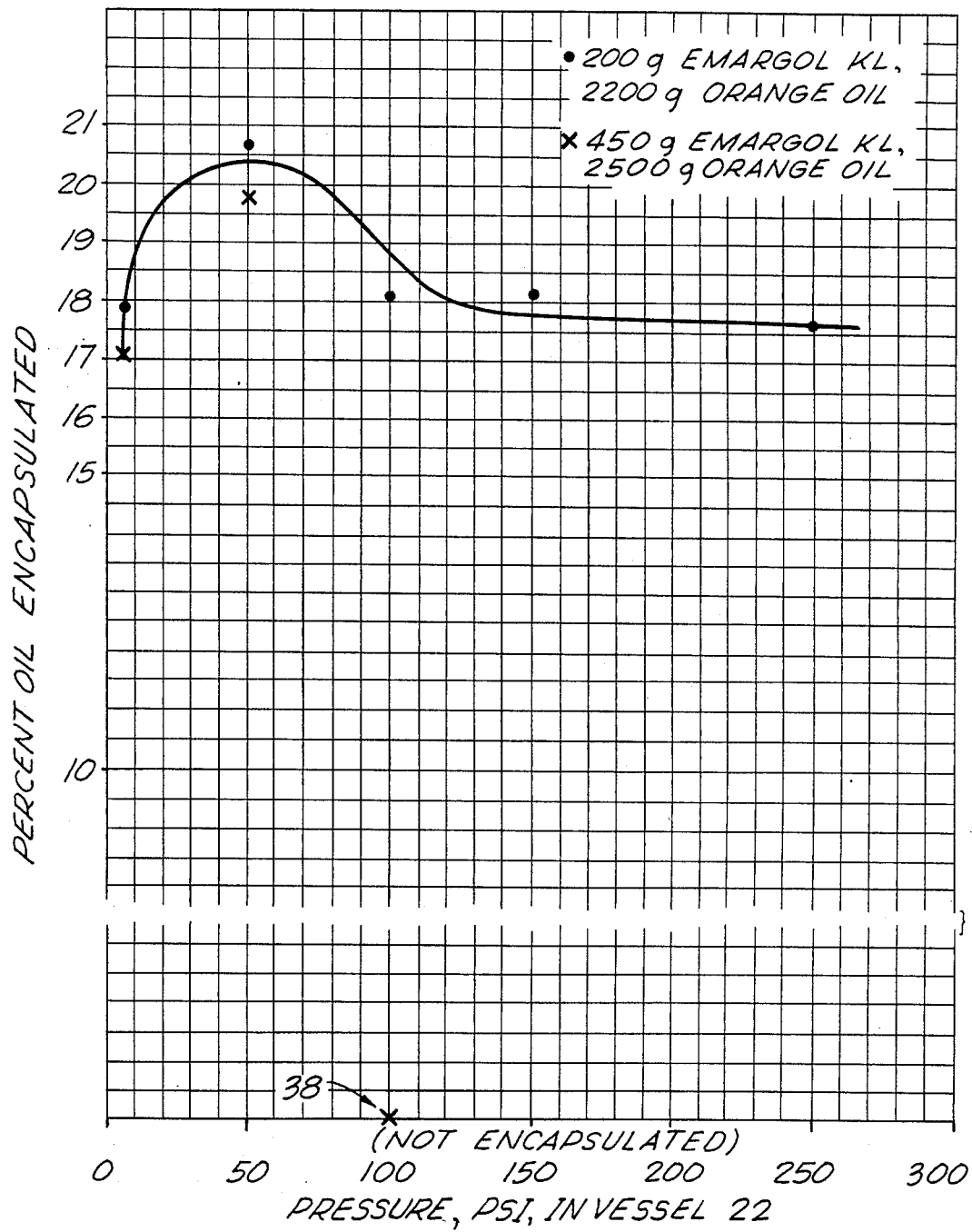

4,610,890

PREPARATION OF SOLID ESSENTIAL OIL FLAVOR COMPOSITION

This is a continuation-in-part of U.S. patent application Ser. No. 631,302 filed July 16, 1984 and now abandoned by at least one inventor in common with the present application, under assignment to the assignee of the present invention.

BACKGROUND OF THE INVENTION

The present invention relates to a process for producing a solid essential oil flavor composition and the product of the process and more particularly to such a process resulting in a product in the form of a stable, extruded, solid essential oil flavor composition.

In order to preserve the aroma and flavor of various essential oils and make them available for use in consumer products such as beverages and the like, the prior art has developed a number of techniques for producing solid essential oil compositions. These compositions permit combination of the essential oils into various products such as beverages to which it is desirable to impart the aroma and flavor of the oil. Such techniques have been found to be particularly useful and desirable, for example, in connection with essential oils of various citrus fruits while being equally useful with essential oils from other sources. Citrus fruit, for example, are characterized by essential oils having particularly desirable characteristics of aroma and flavor which are useful not only in beverage products but in various food products as well.

The prior art in this regard is believed to be best exemplified by a number of U.S. patents which are hereinafter discussed in greater detail. These references include U.S. Pat. Nos. 2,809,895 and 3,041,180 issued respectively on Oct. 15, 1975 and June 26, 1962 to H.E. Swisher under assignment to the assignee of the present invention. The references also include U.S. Pat. No. 3,704,137 issued Nov. 28, 1972 to Beck and U.S. Pat. No. 4,271,202 issued June 2, 1981 to Giel.

Turning now to these references, the earlier Swisher patent disclosed a process for forming solid essential oil flavoring composition particles wherein an essential oil was emulsified in hot corn syrup solids (42 DE) glycerine solution, cooled, ground, rinsed with a solvent and dried. The flavoring composition retained the aroma and flavor of the oils within the particles while making them available for release in various consumer products such as beverages and other food products.

The second Swisher patent disclosed an improved process and solid essential oil flavoring composition wherein glycerine and corn syrup solids (42 DE) were formed into an aqueous, semiplastic mass which was then combined with the essential oil by means of an emulsifier, the resulting combination being extruded into a cold solvent to form an extruded solid wherein the essential oil was encapsulated by the glycerine and corn syrup solids combination. This extruded solid was then dried and an anticaking agent added, yielding an extruded particulate solid having an extended shelf life while facilitating its combination with beverage or other food products to release the aroma and/or flavor of the oil.

The Beck patent related to a similar process and product as summarized above for the second Swisher patent, except that the process and product included a simple sugar and hydrolyzed cereal solids (less than 20 DE) with pyrogenic silica as an anticaking agent.

The Giel patent related to a spray-drying process for forming solid flavoring material capable of including high percentages of flavoring oil per total particulate unit of weight. Because of the high oil content possible, such spray-dried products found wide use in a number of beverages and other foods. However, it was also found that spray-dried flavors typically exhibit a relatively limited shelf life. In addition, the high temperatures necessarily involved during spray-drying processes have been found to impair the flavor and aroma of various heat-sensitive oil flavors, such as those in citrus fruit. Furthermore, solids formed by spray-drying commonly exhibit hygroscopic characteristics making them difficult to handle and store.

As noted above, spray-dried oil flavors have been used in the production of various beverages and foods where it is desirable to take advantage of their high oil content. At the same time, extruded essential oil solids of the type covered by the second Swisher and Beck patents have also found a substantial market, particularly where it is desirable to take advantage of the better preserved aroma and flavor of the oil. However, as was noted in the Beck patent, the process for forming such extruded essential oil flavor compositions has heretofore been considered to have a practical maximum essential oil content of about 12% in the extruded particles. This limitation has at times prevented or limited the use of extruded flavor compositions in certain products where high oil content is desirable.

A number of patents issued to T. H. Schultz, either alone or with other inventors, including U.S. Pat. Nos. 2,856,291; 2,857,281; U.S. Pat. No. 2,899,313; U.S. Pat. No. 2,919,989; U.S. Pat. No. 2,929,722 and U.S. Pat. No. 2,929,723. Certain of these patents related to processes for encapsulating essential oils in generally the same manner as the Beck patent noted above. In Schultz et al U.S. Pat. No. 2,857,281, reference was made generally to use of an essential oil or flavoring agent "to furnish about from 5 to 25% thereof in the emulsion." However, in the specific disclosures and examples provided in the Schultz et al patent as well as in the other patents where Schultz was an inventor, resulting oil percentages in encapsulated form were far below the practical limit of 12% noted above and initially stated in the Beck patent.

Accordingly, there remains a need for a process making possible the formation of stable, extruded, solid essential oil or flavor compositions having a relatively high percentage of essential oil encapsulated therein, preferably at least in excess of the practical limit of 12% as stated in the Beck patent.

SUMMARY OF THE INVENTION

It is therefore an object of the invention to provide an improved process for forming an extruded, solid, essential oil flavor composition and a product of such process while overcoming one or more problems of the type summarized above.

It is a further object of the invention to provide such a process for producing a resulting product characterized by a relatively high essential oil or oil-soluble flavor content completely encapsulated within the extruded particulate solids.

It is an even further object of the invention to provide such a process for forming a resulting product in the form of a stable, melt-based and extruded, solid essential oil flavor composition characterized by about 12 to 35% by weight of essential oil in substantially completely encapsulated form within the extruded solids. A somewhat higher percentage of the essential oil or oil-soluble flavor is initially added in the process to accommodate oil losses, for example, during emulsification and solvent washing of the product.

It is a related object of the invention to provide such a process for forming a resulting product in the form of a stable, melt-based and extruded, solid essential oil flavor composition wherein a selected quantity of essential oil is combined and blended with an aqueous mixture of a sugar, starch hydrolysate and selected emulsifier and at least preferably about 60% by weight, more preferably 70% by weight and most preferably about 75 to 80% by weight of the selected quantity of essential oil is present in encapsulated form within the resulting particulate essential oil composition.

Although, as noted above, the solid essential oil flavor composition of the invention is preferably characterized generally by about 12 to 35% by weight of essential oil in substantially completely encapsulated form, the present invention more preferably contemplates the solid essential oil flavor composition as being characterized by about 14 to 30% by weight of essential oil in substantially completely encapsulated form within the extruded solids.

In accordance with the present invention, it has been found that such a process and product are possible by first forming an aqueous mixture of a sugar and starch hydrolysate in combination with a suitable emulsifier, the aqueous mixture and emulsifier is combined and blended with a selected quantity of an essential oil or oil-soluble flavor in a closed vessel to form a homogeneous melt under controlled pressure conditions substantially greater than atmospheric pressure.

It is an even further object of the invention to provide such a process and product of the process wherein the blending step is carried out in a closed vessel pressurized within the range of from about 7 to 50 pounds per square inch (psi) or more.

It is yet a further related object of the invention to cook the aqueous mixture of the sugar and starch hydrolysate preferably to a maximum temperature of about 126° C. before the aqueous mixture and a selected emulsifier are combined and blended with the essential oil in a closed vessel as described above. More preferably, the aqueous mixture is heated to a maximum temperature of about 124° C. and most preferably to a temperature in the range of about 122° to 124° C. generally under atmospheric pressure conditions. These temperatures are especially applicable where the essential oil comprises at least about 28% by weight of the combination just prior to emulsification.

A still further related object of the invention is to carry out the heating step whereby the resulting particulate essential oil composition has a relatively higher water content, preferably at least about 5% by weight.

In connection with the present invention, the term "sugar" is intended to include simple sugars such as sucrose, lactose, levulose, dextrose, fructose and maltose, as well as polyols such as glycerin and even other sweeteners having generally similar characteristics. Similarly, the term "starch hydrolysate" is intended to include all hydrolyzed starches, both hydrolyzed cereal solids of about 20 DE or less and corn syrup solids of about 20 DE or higher. The term "emulsifier" is used herein to indicate any emulsifier which is satisfactory for use particularly in combination with the selected flavoring oil. Specific examples of suitable emulsifiers are set forth within the following detailed description. In addition, the term "essential oil" is intended to include other oil soluble flavors which are capable of incorporation in the process and product of the present invention.

Additional objects and advantages of the invention are made apparent in the following description having reference to the accompanying drawings.

BRIEF DESCRIPTION OF THE DRAWINGS

FIG. 1 is a block-type flow sheet including steps of the process of the present invention and for forming the product of that process.

FIG. 2 is a graphic representation of the effect of increased pressure on encapsulation of the essential oil flavoring within the product of the process.

DETAILED DESCRIPTION OF THE PREFERRED EMBODIMENTS

As noted above, the present invention relates to a process for forming or preparing a stable, melt-based and extruded solid essential oil flavor composition in particulate form as well as the product of the process. Generally, the process comprises the steps of (1) heating to a suitable cook temperature an aqueous mixture of a sugar and a starch hydrolysate together with a selected emulsifier, the cook temperature being approximately the boiling point of the aqueous mixture, (2) blending a selected quantity of an essential oil flavor with the aqueous mixture to form a homogeneous melt, (3) extruding the homogeneous melt into a relatively cool liquid solvent to form extruded solids of selected size and shape, and (4) drying the particles and blending with a selected anticaking agent to produce a stable and relatively non-hygroscopic composition in particulate form. The process is improved by the present invention in that the step of blending or emulsifying the essential oil with the aqueous mixture is carried out in a closed vessel and the quantity of essential oil flavor added to the homogeneous melt is preferably selected to provide about 12 to 35% by weight and more preferably about 14 to 30% by weight of essential oil flavor in completely encapsulated form within the particulate oil composition.

The present invention further contemplates a process and product of the process wherein preferably at least about 60% by weight, more preferably at least about 70% by weight and most preferably at least about 75 to 80% by weight of a selected quantity of essential oil combined and blended with the aqueous mixture is present in encapsulated form within the resulting particulate essential oil composition.

The invention also contemplates that the sugar and starch hydrolysate, either together with or prior to combination of the selected emulsifier therein, is preferably heated to a maximum temperature of about 126° C. in order to minimize flavor deterioration of the essential oil flavor and also to facilitate encapsulation according to the present invention. More preferably, the heating temperature is limited to a maximum of about 124° C. and most preferably, the aqueous mixture is heated to a temperature in the range of about 122° to 124° C. generally under atmospheric pressure conditions. These reduced temperatures are of greatest value when the essential oil comprises at least about 28% by weight of the combination.

These temperature limits are discussed in connection with the present invention in greater detail below. In addition to minimizing deterioration of flavor and other undesirable characteristics of the essential oil which commonly result at higher temperatures, the reduced cook temperature is also believed to permit a relatively increased amount of water to remain in the melt prior to extrusion. It is theorized that this additional water assists in stabilizing and facilitating emulsification and encapsulation of the higher quantities of essential oil within the particulate solid in accordance with the process of the present invention. Preferably, the invention contemplates that the particulate solid resulting from the process of the present invention comprise at least about 5% by water.

At the same time, the above temperature conditions for the heating step are preferably stated as maximums at least within the broad and preferred ranges since a number of variations in the process may be carried out for accomplishing similar results under even further reduced temperatures. For example, it has been found that a lower cook temperature may be used where a lower DE rated sugar or sweetener is employed. For example, if a 10 DE sweetener were employed in place of the 20 DE sweetener described below in connection with a number of examples, it would be possible to further reduce the cook temperature in accordance with the present invention. Similarly, it would also be possible to reduce the cook temperature while otherwise achieving the objects of the present invention by either employing a greater degree of agitation during the cooking process in order to facilitate removal of excess water therefrom or by carrying out the cooking process under vacuum conditions for the same purpose.

The second Swisher patent and the Beck patent referred to above discussed in substantial detail the manner in which a homogeneous melt can be formed from an aqueous mixture of a sugar and starch hydrolysate together with a separate flavor component to form an extruded solid capable of being dried in the manner summarized above. Those references also discussed the manner in which such a homogeneous melt can be extruded into a cool liquid solvent to form particles of selected shape and size as well as the selection of a suitable anticaking agent for combination with the extruded solid particles in order to maintain them in a more stable condition. Accordingly, those references are incorporated herein as though set forth in full with respect to the particular features referred to above.

Referring now to the drawings and particularly to FIG. 1, a selected sugar and starch hydrolysate are mixed together as indicated at 12. The mixture is then agitated in order to uniformly mix together the sugar and starch hydrolysate. As noted above, the sugar may be any of the simple sugars such as sucrose, levulose, dextrose, fructose or maltose, as well as a polyol such as glycerine or other similar sweeteners. Any preferred sugar or sweetener may be used for any of a variety of reasons, such as to achieve improved flavor of the resulting product and/or to reduce hygroscopicity of the product. The mixture 12 is then heated to a cook temperature preferably approximating its boiling point as indicated at 14. A suitable cook temperature for such mixtures including most sugars extends across a range of approximately 110° to 130° C. For example, with the sugar being sucrose and the starch hydrolysate being 20 DE corn syrup, the boiling point of the mixture is approximately 125°–130° C. and the mixture is preferably heated to a temperature within that range.

An emulsifying agent is preferably added to the aqueous mixture 12 after the heating step. Within FIG. 1, addition of the emulsifying agent is indicated at 16. The emulsifier is selected to facilitate emulsification or dispersion of essential oil described below into the mixture 14. Selection of the particular emulsifier and the quantity of the emulsifier added to the aqueous mixture 14 is one of the important features of the present invention permitting from 12 to 35% of a selected essential oil to be encapsulated within the final extruded product. Suitable emulsifiers for use within the present invention include sulfoacetates of mono- and diglycerides as well as polyglycerol esters and lecithin. Polyglycerol esters suitable for use within the present invention are available, for example, under the trademark identification DREWPOL 6-2-S available from California Fats & Oils, Richmond, Calif. Generally, the polyglycerol esters have been found satisfactory within the present invention for the lower end of the specified range.

One preferred emulsifier for emulsifying and encapsulating up to 35% essential oil within the final extruded product is a sulfoacetate of mono- and diglycerides containing 1% by weight water and available under the trademark identification EMARGOL KL available from the Witco Company. Emulsifiers such as those referred to above are added to the molten mixture 14 in the amount of approximately 0.5 to 5% by weight of the aqueous mixture. However, it is to be noted that the amount of emulsifier used in such an application can vary depending upon other factors. Accordingly, the above noted range is set forth only as a general indication in connection with the present invention.

Another emulsifier which has been found to be particularly satisfactory in terms of the present invention but possibly less preferred than the EMARGOL KL product referred to above is lecithin, available for example from Ross & Rowe under the trademark YELKIN TS.

Examples employing both of the emulsifiers noted above are set forth below.

An essential oil or other oil-soluble flavor contemplated for combination with the mixture 14 and emulsifier 16 is generally indicated at 18 and may be an essential oil, for example, of a citrus fruit contemplated for use in beverage or other food products.

The addition of a small amount of an oil-soluble heat-stable antioxidant (indicated at 20 in FIG. 1) such as 4-methyl-2, 6-ditertiary butyl phenol or butylated hydroxyanisole is optional. Generally, from about 0.05 to about 0.5% by weight of the antioxidant, based on the weight of the essential oil, is sufficient.

The essential oil 18, alone or in combination with the antioxidant 20, is then added to the aqueous mixture 14 and emulsifier 16 in a vessel 22. In accordance with the present invention, it is particularly important that the vessel 22 be closed during blending of the essential oil 18 with the cooked aqueous mixture 14 and emulsifier 16. It has been found that the carrying out of this blending or emulsification step in a closed vessel is essential to insure uniform and consistent encapsulation of relatively large quantities of essential oil within the solid product.

The closed vessel 22 is charged with gas, preferably an inert gas such as nitrogen or carbon dioxide, for example, to maximize encapsulation of the oil or flavor. Even more preferably, the vessel 22 is pressurized after addition of the inert gas to a pressure from about 7 to 50 psi. In FIG. 1, addition of the inert gas is generally indicated at 24. Pressurizaion and its effects within the closed vessel 22 are described in greater detail below with further reference to the graph of FIG. 2.

Referring to FIG. 2, encapsulation of substantially increased quantities of essential oils or other oil-soluble flavors is illustrated as being possible with pressurization in the vessel 22 generally from about 7 to about 100 psi. Destabilization of the resulting product sometimes occurs with higher pressures at or above approximately 100 psi. Best results are obtained with the closed vessel 22 if pressure is maintained within the approximate range of 7-50 psi.

In this regard, a pressure of about 7 psi is developed from vapor pressure alone resulting from combination of the essential oil 18 with the molten mixture 14 and emulsifier 16 within the closed vessel. In such an event, the vessel 22 is initially charged either with air or an inert gas at atmospheric pressure.

Referring to FIG. 2, the upper limit of 50 psi for pressurization of the vessel 22 is not a precise limit. In some applications, it is possible to pressurize the vessel substantially above 50 psi and even above 100 psi without causing destabilization. However, since the amount of essential oil capable of encapsulation within the final extruded product tends to diminish when pressure is increased above about 50 psi, that pressure has been selected as the generally preferred upper limit for pressurization of the vessel 22.

Mixing of the essential oil 18, aqueous mixture 14 and emulsifier 16 in the closed vessel 22 under pressure is continued until those components are uniformly mixed and emulsified to result in a homogeneous melt of the type also discused in the Beck and Swisher references, for example. Generally, the homogeneous melt is defined as having a plastic condition suitable for forming a solid product in the manner defined below with an amorphous character for achieving high stability over an extended period of time.

The homogeneous melt from the vessel 22 is then extruded under pressure, using either gas or mechanical pressure, for example, into a cold organic solvent such as isopropanol to form the melt into extruded filaments.

Extrusion is carried out in an extruder 26 having die openings of a size selected in accordance with the size and shape desired for the resulting particles. For example, where small particles are desired for use in beverage or food products, the homogeneous melt from the vessel 22 is extruded through openings (not shown) having diameters, for example, of about 1/32 inch.

Extruded filaments of the homogeneous melt pass from the extruder 26 into a cold organic solvent, such as isopropanol at about −20° C., as generally indicated at 28. The function of the isopropanol or other solvent is two-fold. Initially, it acts as a coolant to rapidly solidify the extruded shapes of homogeneous melt. Secondly, it removes any essential oil on the surface of the extruded solids which would otherwise be susceptible to oxidation.

The extruded filaments are preferably broken up into small rod-like particles while within the solvent 28 in order to permit removal of any essential oil exposed on the smaller or separated particles. For example, the filaments can be divided by impact action of an agitator impeller (not shown) to produce a desired particle size and shape.

Following the solvent washing step 28, the particles from the extruded filaments are then screened or centrifuged at 30 to remove the organic solvent. The solvent is transferred to a holding tank 32 and may be returned to the washing step 28 if desired.

The particles from the separation step 30 are dried in a vacuum oven 33 and blended with a suitable anticaking agent 36. The particles are then screened by passage over a succession of sizing screens (not shown) and packaged, preferably in a dehumidified room, as indicated at 34.

The anticaking agent, as generally indicated at 36, is added to the particles after drying to facilitate their further handling and to prevent the particles from sticking together. The anticaking agent is preferably silica, introduced either before or after the particles are treated in the oven 33.

The process described above may be used for preparing extruded solids containing essential oils from various sources. In particular, the process of the invention is contemplated for use in conjunction with various citrus fruits such as oranges, grapefruit, lemons, etc. However, it will be apparent that the process of the invention is also useful with other essential oil or oil-soluble flavors, either for use in beverages or food products.

The product of the process described above is novelly characterized as a stable, melt-based and extruded, solid essential oil composition in particulate form. The particles are of a solid amorphous character with a shape determined by the extruder 26 and further divided, for example, by impact breaking at 28. The particles consist of a sugar and starch hydrolysate as defined above, a selected emulsifier and a selected essential oil flavor. The essential oil flavor preferably forms about 12 to 35%, more preferably about 15 to 30%, by weight of the particles while being present therein in completely encapsulated form.

The preceding process is particularly adapted for assuring reproducible production of particles having a high oil content as defined above. The process is also particularly adapted for forming about 12 to 35% by weight of the particles with the essential oil flavor being present therein in completely encapsulated form.

The following examples of various embodiments of the invention are presented to further illustrate and exemplify but not to limit the scope of the invention.

EXAMPLE 1

6025 grams of 20 DE corn syrup (70% solids), 4125 grams sugar and 200 grams EMARGOL KL were mixed in a steam jacketed stainless steel vessel. The vessel was fitted with a thermometer and an agitator-assembly produced by C. E. Howard Company, Los Angles, Calif. and having a flat bladed turbine type agitator about 4½ inches in diameter. After heating to 130° during an initial cook, 2200 grams of cold-pressed orange oil were added to the vessel. The vessel was immediately closed. After 5 minutes mixing with the agitator, the pressure inside the vessel had increased to 7 psi. During mixing, the cold-pressed orange oil lowered the temperature of the aqueous mixture below its cooking temperature, for example, to about 125° C. After mixing was complete, nitrogen was added to pressurize the vessel to 30 psi and the melt was extruded through a plate with 0.030 inch diameter holes into 19 liters of cold (−20° C.) isopropanol to solidify the filaments. After impact breaking of the filaments, the excess isopropanol was removed on a vacuum screen and the material was dried for 3 hours in a vacuum oven (50° C., 27 in. Hg vacuum). After addition of 2% silica as an anticaking agent, the product contained 16.7% by weight flavor.

EXAMPLE 2

6025 grams of 20 DE corn syrup (70% solids), 4125 grams sugar and 200 grams EMARGOL KL were mixed in a steam jacketed stainless steel vessel. The vessel was fitted with an agitator and thermometer as in Example 1. After heating to 130° C. in an initial cook, 2200 grams of cold-pressed orange oil were added to the vessel. The vessel was immediately closed and pressurized to 50 psi with nitrogen. After 5 minutes mixing and agitation, the melt was extruded through a plate with 0.030 inch diameter holes into 19 liters of cold (−20° C.) isopropanol to solidify the filaments. The excess isopropanol was removed on a vacuum screen and the material was dried for 3 hours in a vacuum over (50° C., 27 in Hg. vacuum). After blending in 2% silica, the product contained 20.7% by weight flavor.

EXAMPLE 3

6025 grams of 20 DE corn syrup (70% solids), 4125 grams sugar and 450 grams EMARGOL KL were mixed in a stream jacketed stainless steel vessel. The vessel was fitted with an agitator and thermometer again as in Example 1. After heating to 130° C. in an initial cook, 2500 grams of cold-pressed orange oil were added to the vessel. The vessel was immediately closed and pressurized to 50 psi with nitrogen. The melt was then extruded through a plate with 0.030 inch diameter holes into 19 liters of cold (−20° C.) isopropanol to solidify the filaments. The excess isopropanol was removed on a vacuum screen and the material was dried for 3 hours in a vacuum oven (50° C., 27 in. Hg. vacuum). After blending in 2% silica, the product contained 19.8% by weight flavor.

EXAMPLE 4

The steps of Example 3 were repeated except that the vessel was pressurized to 100 psi with nitrogen. Upon extrusion of the resulting product, the solids were found to be destabilized as indicated at 38 in FIG. 2. Thus, Example 4 represents instability of the resulting product upon pressurization to about 100 psi.

The steps of Examples 1-3 are also capable of reproduction with other essential oils, for example, from citrus fruit other than oranges or other oil-soluble flavors.

In addition, the steps of Example 1 were repeated with a number of other combinations of essential oil and emulsifier as typified below in Table I. Table I summarizes Examples 1-4 and illustrates additional Examples 5-8 carried out with the same steps and amounts described above for Example 1 except where different amounts of various components are indicated in Table I. As noted above, about 7 psi pressure was developed within the vessel 22 for each of these examples by vapor pressure of the components being mixed therein. At the same time, the temperature in the vessel was reduced from the initial cook temperature primarily by addition of the essential oil to the cooked aqueous mixture.

TABLE I

| Component | Examples | | | | | | | |
|---|---|---|---|---|---|---|---|---|
| | 1 | 2 | 3 | 4 | 5 | 6 | 7 | 8 |
| Weight EMARGOL KL (grams) | 200 | 200 | 450 | 450 | 450 | 240 | 200 | 200 |
| Weight Flavor Initially Added (grams) | 2,200[1] | 2,200[1] | 2,500[1] | 2,500[1] | 2,500[1] | 4,200[1] | 2,500[2] | 2,350[3] |
| Initial Emulsifier Content (%) | 1.82 | 1.82 | 3.90 | 3.90 | 3.90 | 1.87 | 1.78 | 1.72 |
| Initial Flavor Content (%) | 20.1 | 20.1 | 21.7 | 21.7 | 21.7 | 32.8 | 22.2 | 20.2 |
| Pressure Developed During Mixing (psi) | 7 | 50 | 50 | 100 | 7 | 7 | 7 | 7 |
| Encapsulated Flavor (%) | 16.7 | 20.7 | 19.8 | unstable | 17.1 | 27.6 | 18.4 | 19.3 |

[1] Cold-pressed orange oil
[2] Cold-pressed lemon oil
[3] Cold-pressed tangerine oil Note: Each of the examples of Table I resulted in encapsulation efficiency, as defined above, at least equal to the most preferred level of about 75 to 80% in accordance with the present invention.

The information set forth in Table I is summarized as follows. Initially, for Examples 5-8, the processing steps described in connection with Example 1 were again followed including the identity and weight of sugar and starch hydrolysate. The amount of EMARGOL KL and flavor or essential oil is set forth in Table I for each of the examples. Also, the identity of the flavor or essential oil for each of the examples is indicated in the footnotes to Table I. Thereafter, the initial emulsifier content and flavor or essential oil content are set forth as percentages. These values were calculated based on the total weight of the product prior to extrusion. Accordingly, the percentages are based on a total weight of the sugar, starch hydrolysate, emulsifier and flavor assuming loss of all but about 5% of the water from the corn syrup or starch hydrolysate. Encapsulation efficiency, referred to in the note following Table I, was determined directly from the values for initial flavor content and encapsulated flavor. For example, encapsulation efficiency for Example 1 was determined by dividing 16.7 to 20.1 and multiplying by 100 to result in encapsulation efficiency of about 83.1%.

Information set forth below for additional examples was determined in the same manner described immediately above. It is again noted that, for each of the examples, all but about 5% by weight of the water from the starch hydrolysate was removed during the initial cooking step.

Abbreviated data for Examples 9-13 is set forth in Table II to demonstrate the effect of cook temperature on encapsulation efficiency. The examples set forth in Table II are carried out in the same pilot plant reactor used for each of Examples 1-8. At the same time, each of Examples 9-13 was carried out according to the specific steps set forth in connection with Example 6. The only variation for Examples 9-13 was the heating or cooking temperature to which the aqueous mix was heated during the initial cook.

TABLE II

Encapsulation Efficiency vs. Cook Temperature

| Example No. | % Oil Encapsulated | % Encapsulation Efficiency | Cook Temperature, °C. |
|---|---|---|---|
| 9 | 20.5 | 63.5 | 118 |
| 10 | 22.9 | 70.9 | 122 |
| 11 | 21.1 | 65.3 | 126 |
| 12 | 19.3 | 59.8 | 130 |
| 13 | 19.2 | 59.4 | 134 |

Note: In each of Examples 9-13, 6025 grams of 20 DE corn syrup (70% solids), 4125 grams sugar and 240 grams EMARGOL KL were mixed in a steam jacketed stainless stell vessel fitted with an agitator and thermometer as described for preceding examples. The mixture was then heated to a cook temperature as set forth above in Table II. Thereafter, 4200 grams of cold-pressed orange oil was added, the vessel immediately closed and agitation commenced. A pressure of about 7 psi developed after about five minutes of agitation. The resulting melt was then extruded through a plate with 0.030 inch openings into 19 liters of cold (−20° C.) isopropanol. The solidified filaments were impact broken as described above, excess isopropanol removed by vacuum, the material dried and blended with 2% by weight silica. Resulting encapsulating efficiency for each of Examples 9-13 is set forth in Table II.

The data of Table II is set forth independently of the rest of the examples since Examples 9-13 were all run at about the same time with the same lots or batches of emulsifier, essential oil, etc. Accordingly, Table II is believed to very clearly demonstrate a trend according to the present invention in terms of encapsulation efficiency as determined by the cook temperature.

At the same time, Examples 9-13 represent a relatively limited number of temperatures in the range between 118° C. and 135° C. Table III sets forth a larger number of examples run in a similar manner as the examples of Table II but at different times and possibly with different lots of emulsifier, essential oil, etc. Although the examples of Table III were run in different equipment from those of Table II, they are believed sufficently similar so that Tables II and III taken together tend to establish the same trend, referred to above in connection with Table II alone, as to the effect of cook temperature on encapsulation efficiency according to the invention.

Table III, below, sets forth Examples 14-39 which were also carried out in a similar manner as described above for Examples 9-13 of Table II. The examples of Table III were run in a large scale plant reactor rather than the pilot plant reactor used in Table II. However, results in Tables II and III are believed to be clearly capable of correlation to further demonstrate consistency for the process of the present invention.

TABLE III

| Example No. | % Emulsifier Added (EMARGOL KL) | % Orange Oil Added | Cook Temperature °C. | % Oil Encapsulated | % Encapsulation Efficiency |
|---|---|---|---|---|---|
| 14 | 2.03 | 26.6 | 130 | 19.0 | 71.6 |
| 15 | 2.06 | 28.3 | 128 | 21.9 | 77.2 |
| 16 | 2.06 | 28.3 | 130 | 19.9 | 70.2 |
| 17 | 1.97 | 28.35 | 124 | 22.6 | 79.7 |
| 18 | 1.97 | 28.35 | 124 | 22.2 | 78.3 |
| 19 | 2.06 | 28.35 | 124 | 21.4 | 75.5 |
| 20 | 2.06 | 28.35 | 125 | 22.3 | 78.6 |
| 21 | 2.84 | 28.4 | 132 | 14.7 | 51.8 |
| 22 | 1.97 | 28.8 | 130 | 20.7 | 71.9 |
| 23 | 1.91 | 29.3 | 131 | 20.5 | 70.0 |
| 24 | 2.09 | 29.8 | 130 | 20.1 | 67.4 |
| 25 | 2.09 | 29.8 | 132 | 20.1 | 67.4 |
| 26 | 2.01 | 30.2 | 130 | 15.2 | 50.4 |
| 27 | 2.03 | 30.2 | 132 | 16.2 | 53.7 |
| 28 | 2.03 | 31.9 | 124 | 25.9 | 80.9 |
| 29 | 1.96 | 31.9 | 124 | 24.0 | 75.2 |
| 30 | 1.96 | 31.9 | 124 | 25.8 | 81.0 |
| 31 | 1.96 | 31.9 | 124 | 26.1 | 81.9 |
| 32 | 2.03 | 31.9 | 121.7 | 25.4 | 79.7 |
| 33 | 2.03 | 31.9 | 121.7 | 25.9 | 81.2 |
| 34 | 1.96 | 31.9 | 125 | 25.0 | 78.4 |
| 35 | 2.03 | 31.9 | 126 | 25.1 | 78.7 |
| 36 | 1.96 | 31.9 | 126 | 25.6 | 80.4 |
| 37 | 1.96 | 31.9 | 126 | 26.5 | 83.2 |
| 38 | 1.86 | 32.9 | 131 | 14.7 | 44.7 |
| 39 | 2.41 | 32.5 | 134 | 12.8 | 39.4 |

It may also be seen in connection with Table III that unacceptable encapsulation efficiency resulted particularly in connection with Examples 26, 27, 38 and 39. Each of these examples included a generally high cook temperature varying from about 130° to about 134° C. In addition, those same examples included relatively high initial essential oil contents ranging from about 30.2 to about 32.9% by weight. Accordingly, Table III is believed to even further emphasize the importance of cook temperature in accordance with the present invention.

Table IV, below, sets forth yet an additional series of Examples 40-42, each carried out using lecithin as an emulsifier.

TABLE IV

| Example No. | % Emulsifier Added (Lecithin) | % Orange Oil Added | Cook Temperature °C. | % Oil Encapsulation | % Encapsulation Efficiency |
|---|---|---|---|---|---|
| 40 | 2.21 | 22.1 | 130 | 18.1 | 81.9 |

TABLE IV-continued

| Example No. | % Emulsifier Added (Lecithin) | % Orange Oil Added | Cook Temperature °C. | % Oil Encapsulation | % Encapsulation Efficiency |
|---|---|---|---|---|---|
| 41 | 1.95 | 22.2 | 130 | 18.4 | 82.9 |
| 42 | 1.43 | 28.6 | 124 | 22.7 | 79.4 |

Table IV illustrates the utility of the present invention including lecithin as an emusifier. In each of Examples 40-42 of Table IV, lecithin available from Ross & Rowe under the tradename YELKIN TS was employed.

Table IV in particular demonstrates that lecithin was quite effective as an emulsifier where the essential oil was initially present in an amount of about 22% by weight. With an initial essential oil percentage of about 28, for example, it is particularly important to employ a lower cook temperature of no more than about 126° C. and preferably no more than about 123° to 124° C. in order to achieve effective encapsulation efficiency.

FURTHER DISCUSSION OF PRIOR ART

In order to further illustrate advantages of the present invention, Table V sets forth Examples 43-51 *only for the purpose of representing* the *prior art for purposes of comparison*. Examples 43-51 were conducted in essentially the same manner as Examples 9-13 of Table II but with the vessel remaining open during mixing of the essential oil with the aqueous mix.

TABLE V
(PRIOR ART)

| Example No. | % Emulsifier Added | % Flavor Added | % Flavor Encapsulated | % Encapsulation Efficiency |
|---|---|---|---|---|
| 43 | 1.41 | 16.4 | 14.7 | 90 |
| 44 | 1.41 | 16.4 | 10.8 | 66 |
| 45 | 1.87 | 16.4 | 13.4 | 82 |
| 46 | 1.87 | 16.4 | 10.8 | 66 |
| 47 | 2.78 | 16.2 | 14.4 | 89 |
| 48 | 2.78 | 16.2 | 11.9 | 77 |
| 49 | 2.71 | 18.1 | 6.0 | 33 |
| 50 | 2.71 | 18.1 | 12.2 | 67 |
| 51 | 2.65 | 19.9 | 10.0 | 50 |

Examples 43-51 are believed, by contrast, to demonstrate further advantages of the present invention. A cursory review of Table V indicates some high encapsulation efficiencies achieved even with an open mixing vessel, in particular, Examples 43, 45 and 47. However, it is especially important to note that the initial amount of essential oil employed in each of Examples 43-51 was very low compared to that in Examples 1-42.

Even with the advantage of lower initial oil content, encapsulation efficiency was not repeatable even for the limited purpose of accomplishing uniform encapsulation with oil content in the range of bout 12 to 15%. For example, note that whereas Example 43 resulted in encapsulation efficiency of 90%, substantially identical Example 44 resulted only in encapsulation efficiency of 66% with an oil content in encasulated form of only 10.8%. The other examples of Table V demonstrate similar inconsistent results and thus are believed to further assist in emphasizing the novel features of the present invention.

In view of the preceding description and Examples 1-42, other modifications of the process and resulting product of the present invention, in addition to those noted above, will be apparent to those skilled in the art. Accordingly, the scope of the present invention is defined only by the following appended claims.

What is claimed is:

1. An improved process for preparing a stable, melt-based, extruded, solid essential oil flavor composition comprising:
   (i) forming an aqueous mixture of a sugar, a starch hydrolysate and an emulsifier and heating said mixture to approximately its boiling point but not greater than about 126° C.;
   (ii) combining and blending an essential oil flavor with said aqueous mixture by agitating said aqueous mixture and said essential oil flavor in a closed vessel under a pressure of about 7 to 50 psi, to form a homogeneous melt;
   (iii) extruding said homogeneous melt into a relatively cool solvent to form a solid extruded material; and
   (iv) drying and combining said solid extruded material with an anti-caking agent to produce a stable and relatively non-hygroscopic particulate essential oil composition, containing about 14 to 30%, by weight, of the essential oil flavor in encapsulated form.

2. The improved process of claim 1 wherein said sugar is a member selected from the group consisting of sucrose, lactose, levulose, dextrose, fructose, maltose and glycerin.

3. The improved process of claim 1 wherein said starch hydrolysate is a member selected from the group consisting of hydrolyzed cereal solids of about 20 DE or less and corn syrup solids of about 20 DE or higher.

4. The improved process of claim 1 wherein the emulsifier is selected from the class consisting of sulfoacetates of mono- and diglycerides, polyglycerol esters and lecithin.

5. The improved process of claim 1 wherein at least about 60% by weight of the quantity of essential oil combined and blended with the aqueous mixture is present in encapsulated form within the resulting particulate essential oil composition.

6. The improved process of claim 5 wherein at least about 70% by weight of the quantity of essential oil combined and blended with the aqueous mixture is present in encapsulated form within the resulting particulate essential oil composition.

7. The improved process of claim 6 wherein at least about 75 to 80% by weight of the quantity of essential oil combined and blended with the aqueous mixture is present in encapsulated form within the resulting particulate essential oil composition.

8. The improved process of claim 1 wherein the step of heating the aqueous mixture of the sugar, starch hydrolysate and selected emulsifier is limited to a maximum temperature of about 124° C.

9. The improved process of claim 1 wherein the step of heating the aqueous mixture of the sugar, starch hydrolysate and selected emulsifier is carried out generally under atmospheric pressure conditions and at a temperature in the range of about 122° to 124° C.

10. The improved process of claim 1 wherein the step of heating the aqueous mixture of the sugar, starch hydrolysate and selected emulsifier is carried out in a manner to limit water loss from the mixture whereby the resulting particulate essential oil composition has a relatively higher water content.

11. The improved process of claim 10 wherein the resulting particulate essential oil composition comprises at least about 5% by weight water.

12. The improved process of claim 1 wherein the essential oil flavor is an oil of a citrus fruit.

* * * * *